United States Patent
Nishida et al.

(10) Patent No.: US 7,528,359 B2
(45) Date of Patent: May 5, 2009

(54) PROJECTOR

(75) Inventors: Kazuhiro Nishida, Matsumoto (JP); Katsuyuki Uehara, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 8 days.

(21) Appl. No.: 11/736,062

(22) Filed: Apr. 17, 2007

(65) Prior Publication Data
US 2007/0252076 A1    Nov. 1, 2007

(30) Foreign Application Priority Data
May 1, 2006   (JP)   ............................. 2006-127413

(51) Int. Cl.
  G03B 21/00   (2006.01)
  G03B 21/14   (2006.01)
  H01J 40/14   (2006.01)
  H01J 5/16    (2006.01)
(52) U.S. Cl. ........................... 250/216; 353/31; 353/34
(58) Field of Classification Search .................. 250/216; 353/20, 22, 31, 34, 84, 98, 99, 102; 349/4, 349/5
See application file for complete search history.

(56) References Cited

U.S. PATENT DOCUMENTS

| | | | |
|---|---|---|---|
| 6,219,111 B1* | 4/2001 | Fukuda et al. ................. | 349/5 |
| 6,817,718 B2* | 11/2004 | Katoh ........................... | 353/31 |
| 6,942,345 B2* | 9/2005 | Okuyama et al. ............. | 353/20 |
| 2002/0071102 A1* | 6/2002 | Takimoto et al. .............. | 353/31 |
| 2002/0113949 A1* | 8/2002 | Sugawara ..................... | 353/31 |
| 2005/0168699 A1* | 8/2005 | Suzuki et al. ................. | 353/31 |
| 2005/0248736 A1* | 11/2005 | Itoh ............................. | 353/102 |

FOREIGN PATENT DOCUMENTS

JP   A-2006-053430   2/2006

* cited by examiner

*Primary Examiner*—John R Lee
(74) *Attorney, Agent, or Firm*—Oliff & Berridge, PLC

(57) ABSTRACT

A projector includes a light source, an illumination optical system, and a color separating optical system. The color separating optical includes a dichroic mirror which reflects a first color light component of an illumination light through a first optical path by a reflection angle and transmits a second light component through a second optical path; a first mirror which bends the first optical path by a first bent angle; and a second mirror which bends the second optical path by a second bent angle. The reflection angle, the first bent angle, and the second bent angle are arranged to provide a predetermined difference between the length of the first optical path and the length of the second optical path, and the predetermined difference corresponding to a difference between focal distances of a superimposing optical element corresponding to the first and second light components.

8 Claims, 6 Drawing Sheets

PROJECTOR

BACKGROUND

1. Technical Field

The present invention relates to projector that includes a color separating optical system for separating illumination light into color light components having corresponding wavelength ranges and combines and projects color optical images emitted from liquid crystal panels illuminated by the separated light components.

2. Related Art

In general, in projectors, a dichroic mirror separates light emitted from a light source device into a plurality of color light components, but an axial chromatic aberration occurs due to the difference between the wavelengths of color light components. A technique for adjusting the length of an optical path related to a specific color light beam separated from light emitted from a light source has been proposed in order to compensate the axial chromatic aberration (see JP-A-205-181240).

However, the compensation of the axial chromatic aberration is performed on the overall structure of the light source device, and the light source device includes a large number of components. Therefore, it is not easy to adjust the amount of compensation, and the compensation needs to be repeatedly performed.

SUMMARY

An advantage of some aspects of the invention is that it provides a projector capable of easily compensating chromatic aberration to prevent the irregularity or blur of an image, thereby improving the usage efficiency of light.

According to an aspect of the invention, a projector includes: a light source that emit light; an illumination optical system that includes a superimposing optical element capable of performing superimposition illumination and uniformizes the light emitted from the light source to form illumination light; a color separating optical system that includes a dichroic mirror which reflects a predetermined color light component of the illumination light and transmits other light components, thereby separating the light components into a first optical path and a second optical path, a first mirror which bends the first optical path, and a second mirror which bends the second optical path, and adjusts the reflection angle of the predetermined color light component by the dichroic mirror and the bent angles of the optical paths by the first and second mirrors to provide a predetermined difference between the length of the first optical path and the length of the second optical path, the predetermined difference corresponding to a difference between the focal distances of the first and second optical paths of the superimposing optical element; light modulating devices that are illuminated by the color light components emitted from the color separating optical system and form color optical images; a combining optical system that combines the color optical images; and a projection optical system that projects an image combined by the combining optical system.

In the projector according to this aspect, the color separating optical system adjusts the reflection angle of the predetermined color light component by the dichroic mirror and the bent angles of the optical paths by the first and second mirrors to provide a predetermined difference between the length of the first optical path and the length of the second optical path that corresponds to a difference between the focal distances of the first and second optical paths of the superimposing optical element. In this way, it is possible to accurately compensate for the chromatic aberration caused by the superimposing optical element before the light modulating devices form images and thus to prevent the irregularity or blur of an image to be projected, which results in an improvement in the usage efficiency of light. In many cases, the superimposing optical system has the greatest effect on the chromatic aberration when the light modulating devices corresponding to, for example, red, green, and blue light are illuminated. Therefore, it is know that the compensation of the chromatic aberration caused by the superimposing optical element makes it possible to effectively prevent the irregularity of a projected image and thus improve the quality of the projected image.

In the projector according to the above-mentioned aspect, preferably, the superimposing optical element is composed of a single lens. In addition, preferably, when a main wavelength of the predetermined color light component passing through the first optical path and main wavelengths of the other color light components passing through the second optical path are used as reference wavelengths, the length of the first optical path is $L_a$, the length of the second optical path is $L_b$, the refractive index of the single lens with respect to the main wavelength of the predetermined color light component is $n_{\lambda a}$ the refractive index of the single lens with respect to the main wavelengths of other color light components is $n_{\lambda b}$, a curvature radius of an incident surface of the single lens is $r_1$, a curvature radius of an emission surface of the single lens is $r_2$, and the thickness of the single lens is d, the color separating optical system satisfies the following Expression related to a difference $L_a - L_b$:

$$L_a - L_b = f_a - f_b,$$

$$\text{where } \frac{1}{f_a} = (n_{\lambda a} - 1)\left(\frac{1}{r_1} - \frac{1}{r_2}\right) + \frac{(n_{\lambda a} - 1)^2 d}{n_{\lambda b} r_1 r_2}, \text{ and}$$

$$\frac{1}{f_b} = (n_{\lambda b} - 1)\left(\frac{1}{r_1} - \frac{1}{r_2}\right) + \frac{(n_{\lambda b} - 1)^2 d}{n_{\lambda b} r_1 r_2}.$$

In this case, it is possible to accurately calculate the chromatic aberration caused by the single lens of the superimposing optical element, and adjust the reflection angle of a predetermined color light component by the dichroic mirror and the bent angles of the optical paths by the first and second mirrors, on the basis of the calculated chromatic aberration, to provide the predetermined difference required to compensate for the chromatic aberration.

In the projector according to the above-mentioned aspect, preferably, the illumination optical system includes a pair of fly-eye lenses. In this case, the pair of fly-eye lenses serve as light beam separating optical elements for separating a light beam into a plurality of partial light beams and uniformizing illumination light.

In the projector according to the above-mentioned aspect, preferably, the first optical path and the second optical path are arranged perpendicular to each other with respect to the combining optical system. In this case, the combining optical system combines color optical images without deviation among the color optical images.

In the projector according to the above-mentioned aspect, preferably, in the illumination optical system, an optical axis up to the second mirror is perpendicular to an optical axis from the second mirror to the combining optical system. In addition, preferably, in the color separating optical system, the dichroic mirror and the first mirror are arranged substantially in parallel to each other. In this case, when the dichroic mirror is inclined such that optical axes before and after the dichroic mirror are not perpendicular to each other, a component, such as the first mirror, of the color separating optical system is appropriately arranged to correspond to the arrangement of the optical axes, which allows to adjust the optical paths to provide the predetermined difference between the lengths of the optical paths.

In the projector according to the above-mentioned aspect, preferably, in the illumination optical system, an optical axis up to the second mirror is not perpendicular to an optical axis from the second mirror to the combining optical system, and in the color separating optical system, the dichroic mirror and the second mirror are arranged substantially in parallel to each other. In this case, when the second mirror and the dichroic mirror are inclined such that optical axes before and after the second mirror and the dichroic mirror are not perpendicular to each other, the light source and other components of the color separating optical system are appropriately arranged to correspond to the arrangement of the optical axes, which allows to adjust the optical paths to provide the predetermined difference between the lengths of the optical paths.

In the projector according to the above-mentioned aspect, preferably, the predetermined color light component is a red light component, and the length of the first optical path is larger than the length of the second optical path. In this case, since the length of the optical path of a red light component that has weak refractive power and is within a relatively long wavelength range becomes long, the difference between the length of the first optical path and the second optical path occurs, which allows to compensate the chromatic aberration.

In the projector according to the above-mentioned aspects, preferably, the predetermined color light component is a blue light component, and the length of the first optical path is shorter than the length of the second optical path. In this case, since the length of the optical path of a blue light component that has strong refractive power and is within a relatively short wavelength range becomes short, the difference between the length of the first optical path and the second optical path occurs, which allows to compensate the chromatic aberration.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
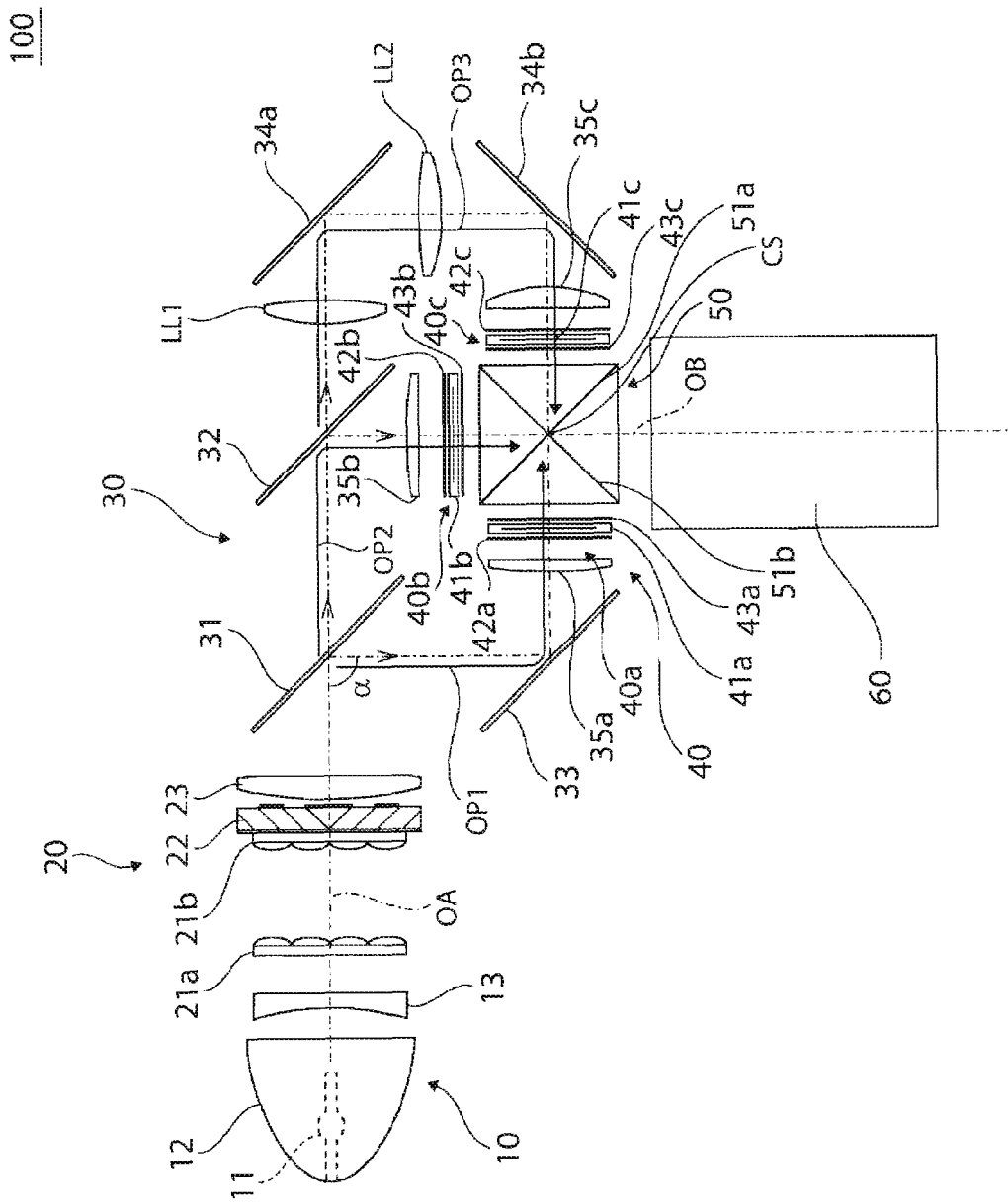
FIG. 1 is a conceptual diagram illustrating a projector according to a first embodiment of the invention.

FIG. 1 is a diagram illustrating a projector according to a first embodiment of the invention. A projector 100 according to the first embodiment includes a light source device 10, an illumination optical system 20, a color separating optical system 30, a light modulating device 40, a cross dichroic prism 50, serving as a combining optical system, and a projection lens 60, serving as a projection optical system.

The light source device 10 includes a light source 11 that emits light within a visible light wavelength range, a reflector 12 that reflects the light emitted from the light source, and a collimating lens 13, which is a collimating unit for collimating light beams.

In the light source device 10, the light source 11 is, for example, a high-pressure mercury lamp, and emits substantially white light having the amount of light required to form an optical image. The reflector 12 reflects the light to converge on a predetermined focus. The collimating lens 13 converts the traveling directions of light beams to be parallel to each other. However, the curved surface of the reflector 12 is generally an ellipsoid, but the invention is not limited thereto. For example, the curved surface of the reflector 12 may be a paraboloid. When the reflector 12 having a paraboloid as a reflecting surface is used, the collimating lens 13 may not be needed.

The illumination optical system 20 is an optical system for dividing a light beam emitted from the light source device 10 into a plurality of partial light beams and making the plurality of light beams incident on an illumination region such that the light beams are superposed to uniformize the in-plane illuminance of the illumination region. The illumination optical system 20 serves as an illuminating device for forming uniform illumination light from the light emitted from the light source. The illumination optical system 20 includes first and second fly-eye lenses 21a and 21b, a polarizing element 22, and a superimposing lens 23, which is a single lens of a superimposing optical element.

Each of the first and second fly-eye lenses 21a and 21b is composed of a plurality of element lenses arranged a matrix, and each of the element Lenses divides light passing through the collimating lens 13 of the light source device 10 and condenses and diffuses the divided light component-s. More specifically, the first fly-eye lens 21a serves as a light beam dividing optical element that divides a light beam passing through the collimating lens 13 into a plurality of partial light beams, and includes a plurality of element lenses in the plane orthogonal to an optical axis OA of illumination light. The outline of each of the element lenses is similar to the shape of an illuminated region (an effective pixel region) of each of liquid crystal light valves 40a, 40b, and 40c, which will be described later. The second fly-eye lens 21b is an optical element that condenses the plurality of partial light beams divided by the first fly-eye lens 21a, and includes a plurality of element lenses n the plane orthogonal to the optical axis OA of illumination light, similar to the first fly-eye lens 21a. However, since the second fly-eye lens 21b is provided in order to condense light beams, it is unnecessary that the outline of each of the element lenses correspond to the shape of the illuminated region of each of the liquid crystal light valves 40a, 40b, and 40c.

The polarizing element 22 comprises a PBS array, and has a function of linearly polarizing the partial light beams divided by the first fly-eye lens 21a in one direction. Although not shown in FIG. 1, the polarizing element 22 has a structure in which polarizing films and reflecting mirrors inclined with respect to the optical axis OA of illumination light are alternately arranged. The polarizing film transmits one of a P polarized light beam and an S polarized light beam included in the partial light beams, but reflects the other light beam. The reflected polarized light, beam is reflected by the reflecting mirror and is then emitted in the direction in which the transmitted polarized light beam is emitted, that is, along the optical axis OA of illumination light. All the emitted polarized light beams are polarized by a retardation plate provided in a strip shape on the light emission surface of the polarizing element 22, so that all the polarized light beams are polarized in the same direction. The use of the polarizing element 22 allows to polarize the light beams emitted from the light source device 10 in the same direction, and thus it is possible to improve the usage efficiency of light used for the liquid crystal light valves 40a, 40b, and 40c.

The superimposing lens 23 is a superimposing optical system that condenses the plurality of partial light beams passing through the first fly-eye lens 21a, the second fly-eye lens 21b, and the polarizing element 22 and superimposes the light beams on an image forming region (effective region) of each of the liquid crystal light valves 40a, 40b, and 40c forming the light modulating device 40. That is, the superimposing lens 23 can superimpose the partial light beams divided by the first fly-eye lens 21a on the liquid crystal light valves 40a, 40b, and 40c, which allows to illuminate the liquid crystal light valves 40a, 40b, and 40c with light having uniform illuminance.

The illumination light formed by the illumination optical system 20 is within a visible light wavelength range, and the superimposing lens 23 of the illumination optical system 20 has a unique refractive index for each wavelength. These factors cause chromatic aberration to occur in the illumination optical system 20, and color irregularity or blur occurs in the light modulating device 40 in the subsequent state due to the chromatic aberration, which may cause the usage efficient of light in the projection 100 to be reduced. In particular, the chromatic aberration generated by the superimposing lens 23 of the illumination optical system 20 has a great effect on the operation of the projector 100. Therefore, it is necessary to compensate the chromatic aberration (which will be described later).

The color separating optical system 30 includes a first dichroic mirror 31, a second dichroic mirror 32, a first reflecting mirror 33, a second reflecting mirror 34a, a third reflecting mirror 34b, and three field lenses 35a, 35b, and 35c. The color separating optical system 30 separates the illumination light formed by the illumination optical system 20 into red (R), green (G), and blue (B) light components, and guides the R, G, and B light components to the liquid crystal light valves 40a, 40b, and 40c in the subsequent state, respectively. More specifically, firstly, the first and second dichroic mirrors 31 and 32 separates the illumination light by reflecting and transmitting light components in a predetermined wavelength range of the visible light wavelength range included in the illumination light. In particular, in this embodiment, the first dichroic mirror 31 reflects the R light component, but transmits the G and B light components. The second dichroic mirror 32 reflects the G light component, but transmits the B light component. That is, the first dichroic mirror 31 separates light emitted from the light source into R, G, and B Might components. The second dichroic mirror 32 separates the light passing through the first dichroic mirror 31 into G and B light components. In this way, as shown in FIG. 1, the R light component is separated by the first dichroic mirror 31 and passes through a first optical path OP1. The G light component is separated by the first and second dichroic mirrors 31 and 32 and passes through a second optical path OP2. The B light component is separated by the second dichroic mirror 32 and sequentially passes through a portion of the second optical path OP2 and a third optical path OP3. As described above; in this embodiment, the R light component, the G light component, and the B light component correspond to the first optical path OP1, the second optical path OP2, and the third optical path OP3, respectively.

Next, in the color separating optical system 30, the R light component reflected from the first dichroic mirror 31 is incident on the field lens 35a for adjusting the incident angle of light through the first reflecting mirror 33. In addition, the G light component having passed through the first dichroic mirror 31 and then reflected from the second dichroic mirror 32 is incident on the field lens 35b for adjusting the incident angle of light. Further, the B light component having passed through the first and second dichroic mirrors 31 and 32 is incident on the field lens 35c for adjusting the incident angle of light through relay lenses LL1 and LL2 and the second and third reflecting mirrors 34a and 34b.

In the color separating optical system 30 according to this embodiment, in order to compensate for chromatic aberration occurring in the superimposing lens 23 of the illumination optical system 20, the angle of the first dichroic mirror 31 deviates from a reference angle of 45° for reflecting the R light component by a predetermined angle, which will be described later. Therefore, the first reflecting mirror 33 also deviates from the reference angle of 45° for reflecting the R light component by a predetermined angle.

The light modulating device 40 is composed of the liquid crystal light valves 40a, 40b, and 40c. The liquid crystal light valves 40a, 40b, and 40c are light modulating devices of a non-emission tree for modulating the spatial intensity distribution of incident illumination light. The liquid crystal light valves 40a, 40b, and 40c include liquid crystal panels 41a, 41b, and 41c that are illuminated by the R, G, and B light components emitted from the color separating optical system 30, first polarizing filters 42a, 42b, and 42c arranged on the incident sides of the liquid crystal panels 41a to 41c, and second polarizing filters 43a to 43c arranged on the emission sides of the liquid crystal panels 41a to 41c, respectively. The R light component reflected from the first dichroic mirror 31 is incident on the liquid crystal panel 41a of the liquid crystal light valve 40a through, for example, the field lens 35a. The G light component having passed through the first dichroic mirror 31 and then reflected from the second dichroic mirror 32 is incident on the liquid crystal panel 41b of the liquid crystal light valve 40b through, for example, the field lens 35b. The B light component having passed through the first and second dichroic mirrors 31 and 32 is incident on the liquid crystal panel 41c of the liquid crystal light valve 40c through, for example, the field lens 35c. The liquid crystal panels 41a to 41c modulate the spatial intensity distribution of the incident light components, and the three color components incident on the corresponding liquid crystal panels 41a to 41c are modulated according to driving signals or image signals incident on the liquid crystal panels 41a to 41c as electric signals. In this case, the polarizing directions of the light components incident on the liquid crystal panels 41a to 41c are adjusted by the first polarizing filters 42a to 42c, respectively. Light components emitted from the liquid crystal panels 41a to 41c are polarized in predetermined polarizing directions by the second polarizing films 43a to 43c, respectively. In this way, the liquid crystal light valves 40a, 40b, and 40c form R, G and B optical images.

The cross dichroic prism 50 combines the R, G, and B optical images emitted from the liquid crystal light valves 40a, 40b, and 40c. More specifically, the cross dichroic prism 50 are formed by bonding four right-angled prisms and has a substantially square shape in plan view. A pair of dielectric multi-layer films 11a and 51b is formed in an X shape at interfaces among the right-angled prisms. The first dielectric multi-layer film 51a reflects an R right component, and the second dielectric multi-layer film 51b reflects a B light component. In the cross dichroic prism 50, the dielectric multi-layer film 51a reflects the R light component emitted from the liquid crystal light valve 40a on the right side, and the dielectric multi-layer films 51a and 51b transmit the G light component emitted from the liquid crystal light valve 40b. In addition, the dielectric multi-layer film 51b reflects the B light component emitted from the liquid crystal light valve 40c on the left side. In this way, the cross dichroic prism 50 combines the R, G, and B light components to form combined light, which is color image light.

The projection lens 60 enlarges the image light, which is the combined light formed by the cross dichroic prism 50 at a predetermined enlargement ratio and projects a color image on a screen (not shown).

Figure 2:
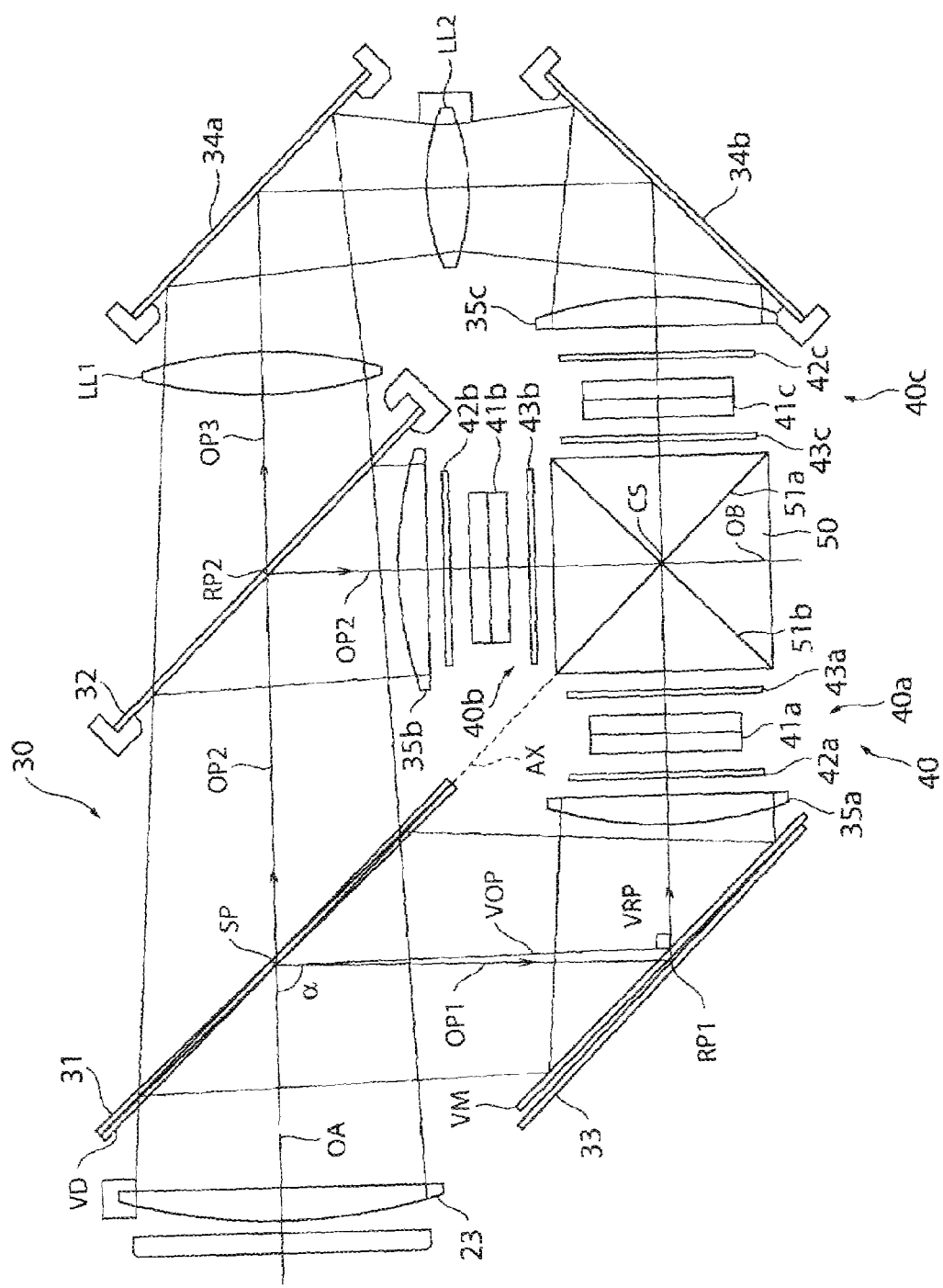
FIG. 2 is a plan view illustrating a color separating optical system of the projector according to the first embodiment.

FIG. 2 is a plan view illustrating the detailed structure of the color separating optical system 30 of the projector 100. In FIG. 9, the same components as those in FIG. 1 have the same reference numerals.

The illumination light emitted from the superimposing lens 23 positioned in the last stage of the illumination optical system 20 (see FIG. 1) is incident on the first dichroic mirror 31. In this embodiment, an intersection between the optical axis OA of illumination light, which is a reference optical path of light emitted from the illumination optical system 20 and an incident surface of the first dichroic mirror 31 is referred to as a separation point SP. Similarly, an intersection between the previous state of a first optical path OP1, which is a reference optical path of the R light component, and a reflecting surface of the first dichroic mirror 33 is referred to as a reflection point RP1, and an intersection between the previous state of a second optical path OP2, which is a reference optical path of the G light component, and a reflecting surface of the second dichroic mirror 32 is referred to as a reflection point RP2. In this case, first, the R light component, which is a predetermined color light component, and the C light component, which is another color light component, of the illumination light are separated into the first optical path OP1 and the second optical path OP2 respectively, using the separation point SP of the first dichroic mirror 31 as a reference point. In this case, the B light component is separated into the second optical path OP2 together with the G light component. Then, the first optical path OP1 related to the R light component is reflected at a predetermined angle, that is, about a right angle, at the reflection point RP1 by the first reflecting mirror 33, which is a first mirror (more specifically, the first optical path OP1 is bent at an angle corresponding to a bent angle α). In addition, the second optical path OP2 related to the G light component is reflected at a predetermined angle, that is, about a right angle, at the reflection point RP2 by the second reflecting mirror 32, which is a second mirror.

In this embodiment, the optical axis OA of illumination light, which is a system optical axis up to the second dichroic mirror 32 and is also an optical axis in the next stage of the superimposing lens 23 provided in the illumination optical system 20, and an optical axis OB of emission light from the dichroic mirror 32 to the cross dichroic prism 50 are orthogonal to each other. In addition, the first dichroic mirror 31 is arranged substantially parallel to the first reflecting mirror 33. In this case, the reflection angle of the R light component by the first dichroic mirror 31 is maintained at a predetermined angle of, for example, about 45°, and there is a predetermined difference between the length of the first optical path OP1 and the length of the second optical path OP2. More specifically, the incident surface of the first dichroic mirror 31 is arranged at an angle slightly larger than 45° with respect to the optical axis OA of illumination light such that the reflection angle of the R light component by the first dichroic mirror 31 is slightly smaller than 45° by a minute angle, that is, such that the first optical path OP1 is bent at a predetermined angle α smaller than 90°. In this way, it is possible to make the length of the first optical path OP1 slightly larger than the length of the second optical path OP2 and thus perform compensation to correspond to chromatic aberration, as compared to the related art. However, in this case, the first reflecting mirror 33 is arranged substantially parallel to the first dichroic mirror 31 so as to correspond to the arrangement, that is, inclination of the first dichroic mirror 31, so that the first optical path OP1 is orthogonal to the incident surface of the liquid crystal light valve 40a. As a result, light is guided to an appropriate direction.

Figure 3:
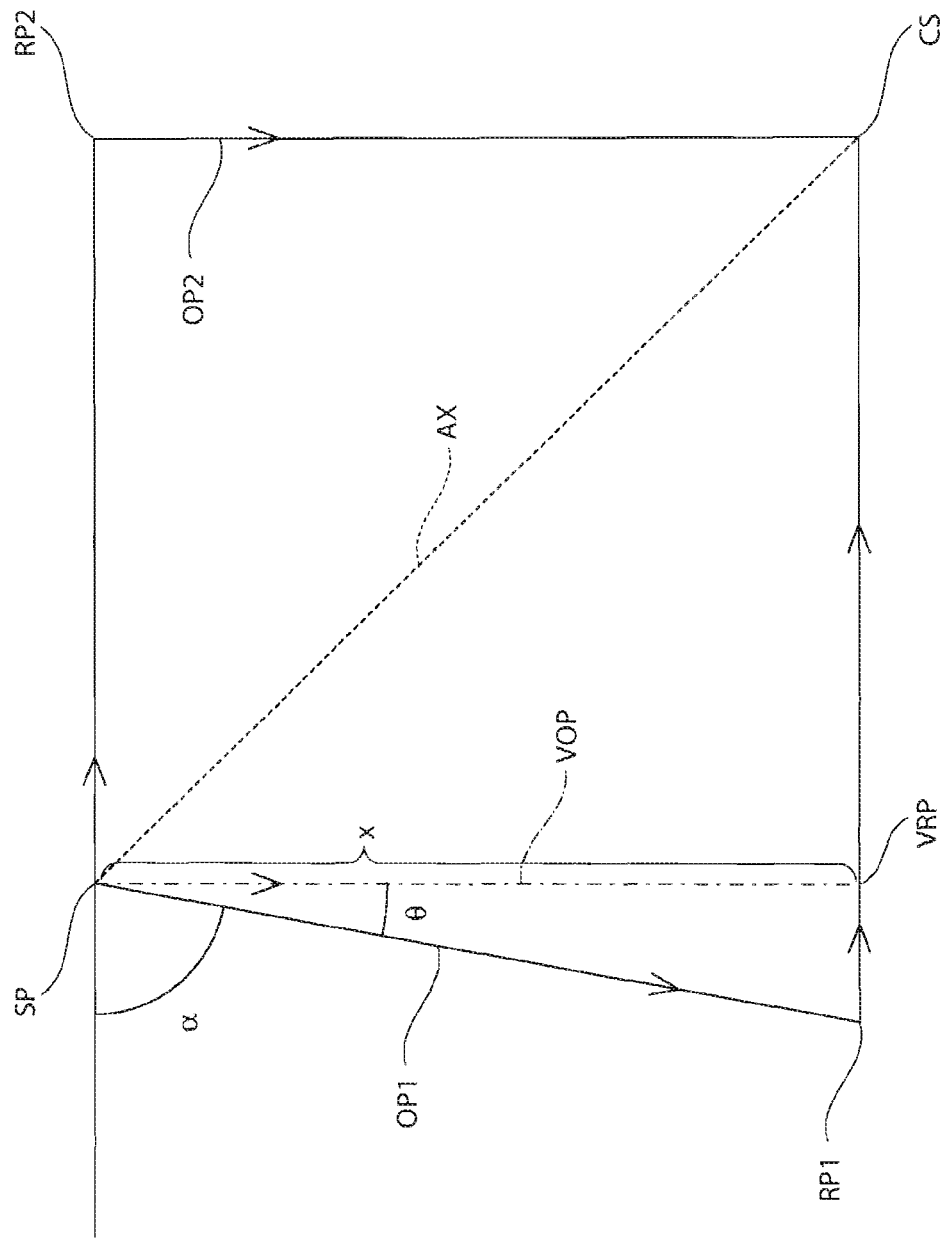
FIG. 3 is a diagram schematically illustrating optical paths of the projector according to the first embodiment.

Next, the comparison between the general structure of the projector according to the related art and the structure of the projector 100 according to this embodiment of the invention will be described with reference to FIGS. 2 and 3. FIG. 3 is a diagram illustrating an optical path according to this embodiment and an optical path according to the related art.

In the projection according to the related art, as shown in FIG. 2, generally, a dichroic mirror VD corresponding to the first dichroic mirror 31 is inclined at an angle of 45° with respect to the optical axis OA of illumination light. Therefore, in this case, an optical path VOP of an R light component, which is reflected light, is bent on the right side at an angle of 90° by the reflection of light by the dichroic mirror VD. In addition, a dichroic mirror VM corresponding to the first dichroic mirror 33 is inclined at an angle of 45' with respect to the optical axis VOP. Therefore, the optical path VOP is bent on the left side at an angle of 90°. A reflection point VRP is an intersection between the optical axis of the optical path VOP and the reflecting surface of the reflecting mirror VM.

As described above, the R light component emitted from the superimposing lens 23 is incident on the liquid crystal light valve 40a through the field lens 35a along the optical path VOP bent in a crank shape. However, G and B light components having passed through the dichroic mirror VD travel along the second and third optical paths OP2 and OP3, respectively, similar to this embodiment of the invention.

As described above, according to the related art, the length of the optical path VOP, which is an optical path of the R light component, is equal to the length of the second optical path OP2, which is an optical path of the C light component. In particular, in this case, the optical path VOP and the second optical path OP2 are symmetric with respect to a plane AX (which is represented by a dotted line) including an Intersecting line CS between a separation point SP and a pair of dielectric multi-layer films 51a, 51b that intersect each other in an X shape in the cross dichroic prism 50. Here, the term 'symmetry' includes rotational symmetry using the plane AX as a reference surface as well as line symmetry using the plane AX as a reference line. That is, the symmetry may also include point symmetry using a middle point between a point indicating the intersecting point CS and the separation point SP as a central point of rotation on the plane shown in FIG. 2.

In contrast, in this embodiment of the invention, first dichroic mirror 31 and the first dichroic mirror 33 are inclined to make the length of the first optical path OP1 larger than the length of the second optical path OP2, which causes the first and second optical paths to be asymmetric with respect to the plane AX. In this embodiment, since the arrangement, that is, inclination of the first reflecting mirror 33 is set appropriately, the first optical path OP1 of light reflected by the first reflecting mirror 33 is adjusted so as to be aligned with the optical path VOP of light reflected by the reflecting mirror VM. Therefore, in this case, light components are incident on the cross dichroic prism 50 shoe in FIG. 1 along the first optical path OP1 and the second optical path OP2 orthogonal to each other.

Next, the comparison between this embodiment of the invention and the related art will be described with reference to FIG. 3. More specifically, the difference between the length of the first optical path OP1 and the second optical path OP1 according to) this embodiment of the invention will be described below.

First, in this embodiment, the length of the first optical path OP1 is referred to as $L_R$, and the length of the second optical path OP2 is referred to as $L_G$. That is, the difference between the length of the first optical path OP1 and the second optical path OP2 is represented by $L_R - L_G$. In addition, an inclination angle $\theta$ indicates an angle formed between the first optical path OP1 of this embodiment of the invention and the optical path VOP of the related art. That is, $\theta = 90° - \alpha$.

Hereinafter, the value of the difference $L_R - L_G$ between the length of the first optical path OP1 and the optical path VOP will be described below.

As can be seen from FIG. 3, while the first optical path OP1 reaches the reflection point VRP from the separation point SP via the reflection point RP1, the optical path VOP directly reaches the reflection point VRP from the separation point SP, which results in the difference between the length of the first optical path OP1 and the length of the optical path VOP. More specifically, when the distance from the separation point SP to the reflection point VRP is 'x', the distance from the separation point SP to the reflection point VRP in the first optical path OP is represented by $x \cdot (1/\cos\theta + \tan\theta)$ since the distance from the separation point SP to the reflection point RP1 is $x/\cos\theta$ and the distance from the reflection point PR, to the reflection point VRP is $x \cdot \tan\theta$. Therefore, the difference between the lengths is expressed by $x \cdot (1/\cos\theta + \tan\theta - 1)$. In this case, as described above, since the length of the optical path VOP is equal to the length of the second optical path OP2, the difference between the lengths is the difference between the length of the first optical path OP1 and the length of the second optical path OP2. That is, the difference $L_R - L_G$ can be ex-pressed by $x \cdot (1/\cos\theta + \tan\theta - 1)$. However, because $\theta = 90° - \alpha$, the value of the difference $L_R - L_G$ can be determined directly and exclusively by adjusting the inclination angle $\alpha$. Since the value of $\alpha$ is sufficiently small, $x \cdot (1/\cos\theta + \tan\theta - 1)$ is approximately $x \cdot \theta$.

Meanwhile, as described above, it is necessary to compensate optical axis chromatic aberration occurring in the superimposing lens 23. Therefore, it is possible to accurately compensate the chromatic aberration of illumination light by determining the difference $L_R - L_G$ on the basis of the main wavelength in the wavelength range of the K light component traveling along the first optical path OP1 and the main wavelength in the wavelength range of the G light component traveling along the second optical path OP2 in the characteristics of the superimposing lens 23.

The refractive indexes of the superimposing lens 23 with respect to the main wavelength of the R light component traveling along the first optical path OP1 and the main wavelength of the G light component traveling along the second optical path OP2 are referred to as $n_R$ and $n_G$, respectively. As characteristics of the superimposing lens 23, the curvature radius of an incident surface of the superimposing lens 23 is referred to as $r_1$, the curvature radius of an emission surface of the superimposing lens 23 is referred to as $r_2$, and the thickness of the superimposing lens 23 is referred to as d. In this case, the difference between the length of the first optical path OP1 and the length of the second optical path OP2 suitable for axial compensating chromatic aberration is represented by Expression 1 given below.

$$L_a - L_b = f_a - f_b, \quad \text{[Expression 1]}$$

where $\frac{1}{f_R} = (n_R - 1)\left(\frac{1}{r_1} - \frac{1}{r_2}\right) + \frac{(n_R - 1)^2 d}{n_R r_1 r_2}$, and $\frac{1}{f_G} = (n_G - 1)\left(\frac{1}{r_1} - \frac{1}{r_2}\right) + \frac{(n_G - 1)^2 d}{n_G r_1 r_2}$.

The above-mentioned Expression 1 makes it possible to appropriately compensate chromatic aberration in the wavelength ranges of R, G, and B light components on the basis of characteristics of the superimposing lens 23 used in this embodiment, such as a material forming the superimposing lens 23 and the shape thereof. Therefore, the difference $L_R - L_G$ may be determined so as to satisfy Expression 1. That is, the inclination angle $\theta$ of the first dichroic mirror 31 shown in FIG. 1 or 2 is set to a value satisfying $x \cdot (1/\cos\theta + \tan\theta - 1) = L_R - L_G = f_R - f_G$ or a value approximate thereto, and the inclination of the first reflecting mirror 33 is adjusted on the basis of the value, thus obtaining the desired value of the difference $L_R - L_G$. In this way, it is possible to accurately compensate chromatic aberration. As a result, the projector 100 according to this embodiment can prevent the color irregularity or blur of an image and thus improve the usage efficiency of light. In addition, it is possible to compensate the chromatic aberration of the B light component incident on the cross dichroic prism 50 through the third optical path OP3 by appropriately adjusting the length of the third optical path OP3 or relay optical systems LL1 and LL2.

In this embodiment, the R light component is reflected by the first dichroic mirror 31 to travel through the first optical path OP1, but the invention is not limited thereto. For example, a combination of light components passing through the first and second optical paths OP1 and OP2 can be appropriately changed under the following conditions.

The chromatic aberration occurs due to the difference among the unique refractive indexes with respect to the wavelengths of R, G, and B light components. In general, light having a short wavelength is refracted at a large angle, but light having a long wavelength is refracted at a small angle. Therefore, as the wavelength of light becomes longer, a longer optical path is needed to compensate the chromatic aberration. For the reason, in this embodiment, it is preferable that the wavelength of light passing through the first optical path OP1 be longer than the wavelength of light passing through the second optical path OP2 as selection conditions of R, G, and B light components passing through the first and second optical paths OP1 and OP2. Therefore, in this embodiment, for example, it is also preferable that the R light component travel through the first optical path OP1 and the B light component travel through the second optical path OP2. In addition, for example, it is also preferable that the G light component travel through the first optical path OP1 and the B light component travel through the second optical path OP2.

Figure 4:
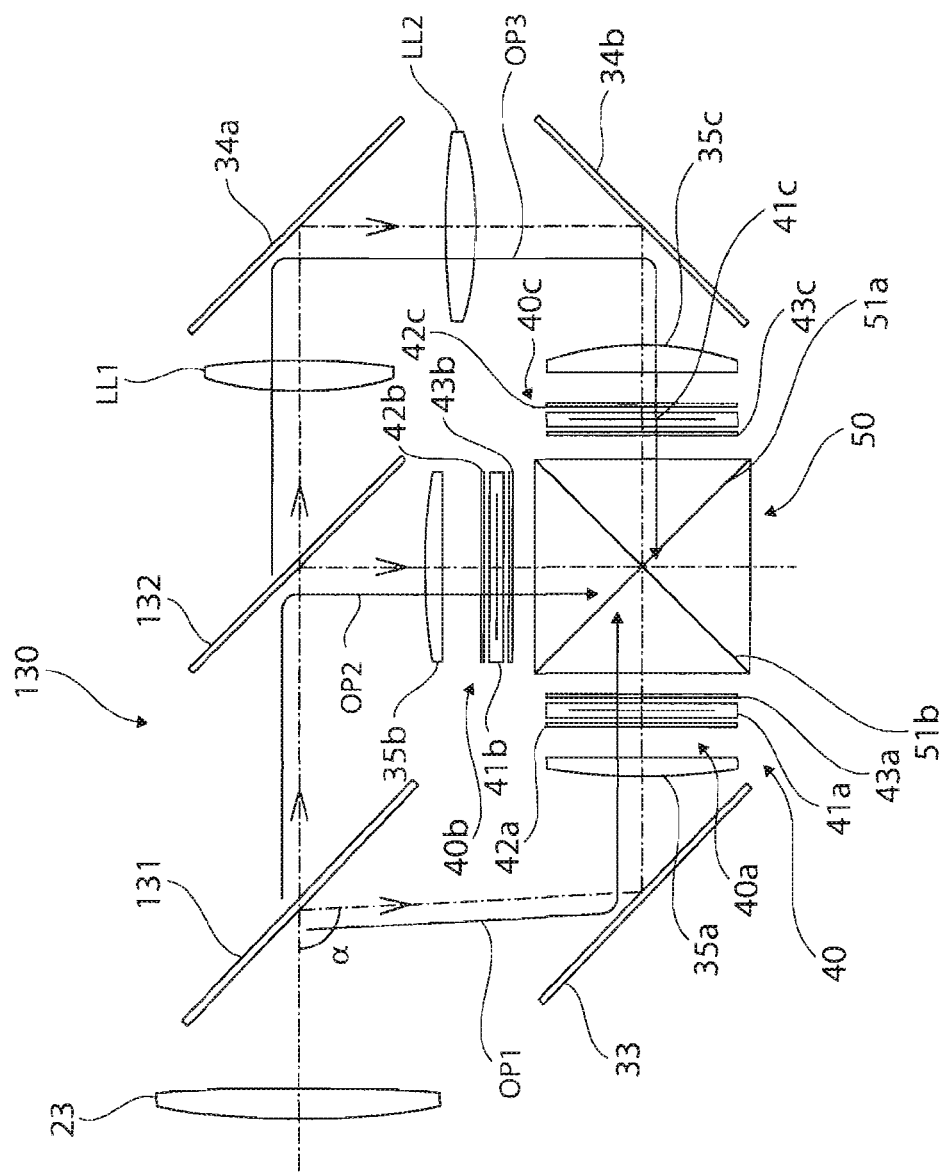
FIG. 4 is a plan view illustrating a color separating optical system of a projector according to a modification of the first embodiment.

FIG. 4 is a plan view illustrating a color separating optical system of a projector according to a modification of this embodiment of the invention. In FIG. 4, the same components as those in this embodiment are denoted by the same reference numerals, and a description of components having the same functions as those in FIG. 1 will be omitted.

In the above-mention embodiment, the length of the first optical path OP1 is larger than that of the second optical path OP2, but in the modification, the length of the first optical path OP1 is smaller than that of the second optical path OP2. That is, in a color separating optical system 130, a first dichroic mirror 131 is inclined in a direction opposite to the direction in the above-mentioned embodiment. In this way, the length of the first optical path OP1 is smaller than the length of the second optical path OP2. In this case, light having a relatively short wavelength travels through the first optical path OP1. Hereinafter, the modification will be described in detail below.

First, the first dichroic mirror 131 reflects a B light component in a short wavelength range among R, G, and B light components, but transmits the G and B light components. A second dichroic mirror 139 reflects the G light component, but transmits the R light component. That is, the first dichroic mirror 131 separates the B light, which is a predetermined color light component, to travel through the first optical path OP1, and separates the G and R light components to travel through the second optical path OP2. The second dichroic mirror 132 separates the G light, which is another color light component, to travel through the second optical path OP2, and separates the R light component to sequentially travel through a portion of the second optical path OP2 and the third optical path OP3. As described above, in this modification, the B light component corresponds to the first optical path OP1, the G light component corresponds to the second optical path OP2, and the R light component corresponds to the third optical path OP3.

In this modification, the first dichroic mirror 131 is arranged such that the bent angle α of the first optical path OP1 is larger than 90°. In this way, it is possible to make the length of the first optical path OP1 shorter than the length of the second optical path OP2. In this case, the first reflecting mirror 33 is also arranged such that the first optical path OP1 is formed in an appropriate direction according to the arrangement, that is, the inclination of the first dichroic mirror 131.

In the above-mentioned structure, the difference between the length of the first optical path OP1 and the length of the second optical path OP2 is calculated in the same manner as that used in the above-mentioned embodiment. In addition, similar to the above-mentioned embodiment, it is possible to calculate the difference between the lengths of the optical paths suitable for compensating axial chromatic aberration by finding the main wavelengths of the B and G light components satisfying a conditional expression related to characteristics of the superimposing lens 23.

In this modification, patterns other than the above-mentioned example will be considered. That is, as the selection conditions of light components traveling through the first and second optical paths OP1 and OP2, the wavelength of light traveling through the first optical path OP1 is preferably shorter than the wavelength of light traveling through the second optical path OP2, considering the cause of the chromatic aberration. Therefore, alternatively, for example, the B light component may pass through the first optical path OP1, and the R light component may pass through the second optical path OP2. In addition, for example, the G light component may pass through the first optical path OP1, and the R light component may pass through the second optical path OP2.

Second Embodiment

In the first embodiment, the dichroic mirror is inclined at a predetermined angle with respect to the optical axis OA of illumination light in the illumination optical system. However, in a second embodiment, the optical axis OA of illumination light is inclined, which will be described below. That is, will the first embodiment, as shown in FIG. 1, the optical axis OA of illumination light, which is an optical axis of the illumination optical system 20 and is also an optical axis of a system up to the second dichroic mirror 32, is perpendicular to an optical axis OB of light emitted from the second dichroic mirror 32 to the cross dichroic prism 50. However, in the second embodiment, the optical axis OA is not perpendicular to the optical axis OB. In addition, in the first embodiment, as shown in FIG. 1, the first dichroic mirror 31 is arranged so as to be substantially parallel to the first reflecting mirror 33. However, in the second embodiment, a first dichroic mirror 231 is arranged so as to be substantially parallel to a second dichroic mirror 232 (see FIG. 5).

Figure 5:
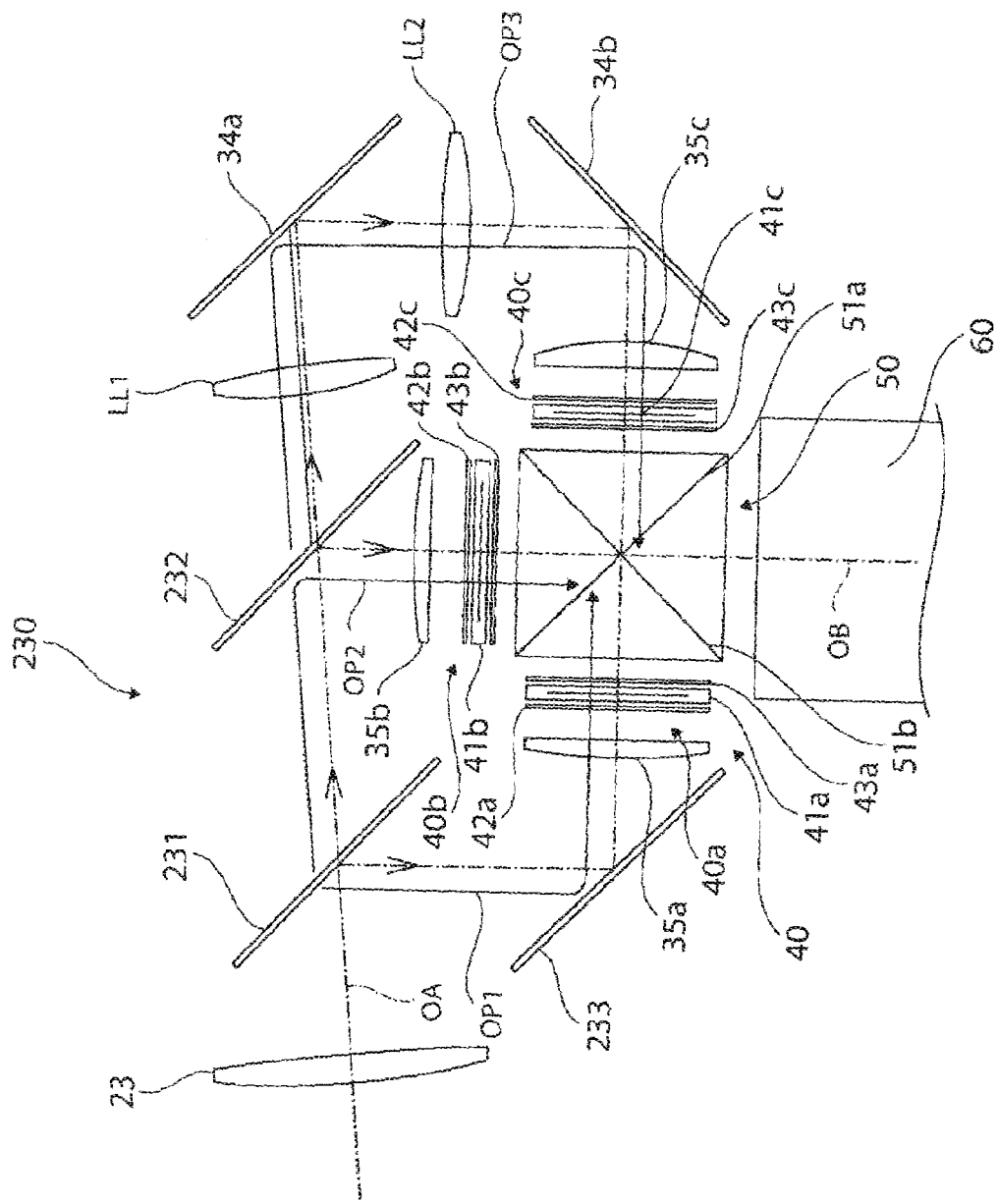
FIG. 5 is a plan view illustrating a color separating optical system of a projector according to a second embodiment of the invention.

FIG. 5 is a plan view illustrating a color separating optical system 230 of a projector according to the second embodiment. The overall structure of the projector according to the second embodiment is the same as that of the projector 100 according to the first embodiment shown in FIG. 1, and thus a description thereof will be omitted. In FIG. 5, the same components as those in the first embodiment are denoted by the same reference numerals, and a description of components having the same functions as those in FIG. 1 will be omitted.

As described above, in the second embodiment, the optical axis OA of illumination light is not perpendicular to the optical axis OB of emission light. In particular, in FIG. 5, an angle formed between the optical axis OA of illumination light and the optical axis OB of emission light is smaller than 90°. In this case, the second dichroic mirror 232, which is a second mirror for bending the second optical path OP2, is arranged at a predetermined angle so that the second optical path OP2 is aligned with the optical axis OB of emission light. In addition, the first dichroic mirror 231 is arranged so as to be substantially parallel to the second dichroic mirror 232, and the first optical path OP1 is substantially parallel to the second optical path OP2. The first reflecting mirror 233 is inclined at an angle of 45° with respect to the first optical path OP1, which causes the first optical path OP1 to be bent at a right angle. In this way, the first optical path OP1 and the second optical path OP2 are perpendicular to each other such that light components passing through the first and second optical paths are incident on the cross dichroic prism 50 at right angles to each other.

In the above-mentioned structure, the length of the first optical path OP1 is shorter than the length of the second optical path OP2. Therefore, it is possible to pass light in a relatively short wavelength range (for example, a B light component) through the first optical path OP1 and thus to obtain a difference between the length of the first optical path OP1 and the length of the second optical path OP2 suitable for compensating axial chromatic aberration, similar to the first embodiment.

Figure 6:
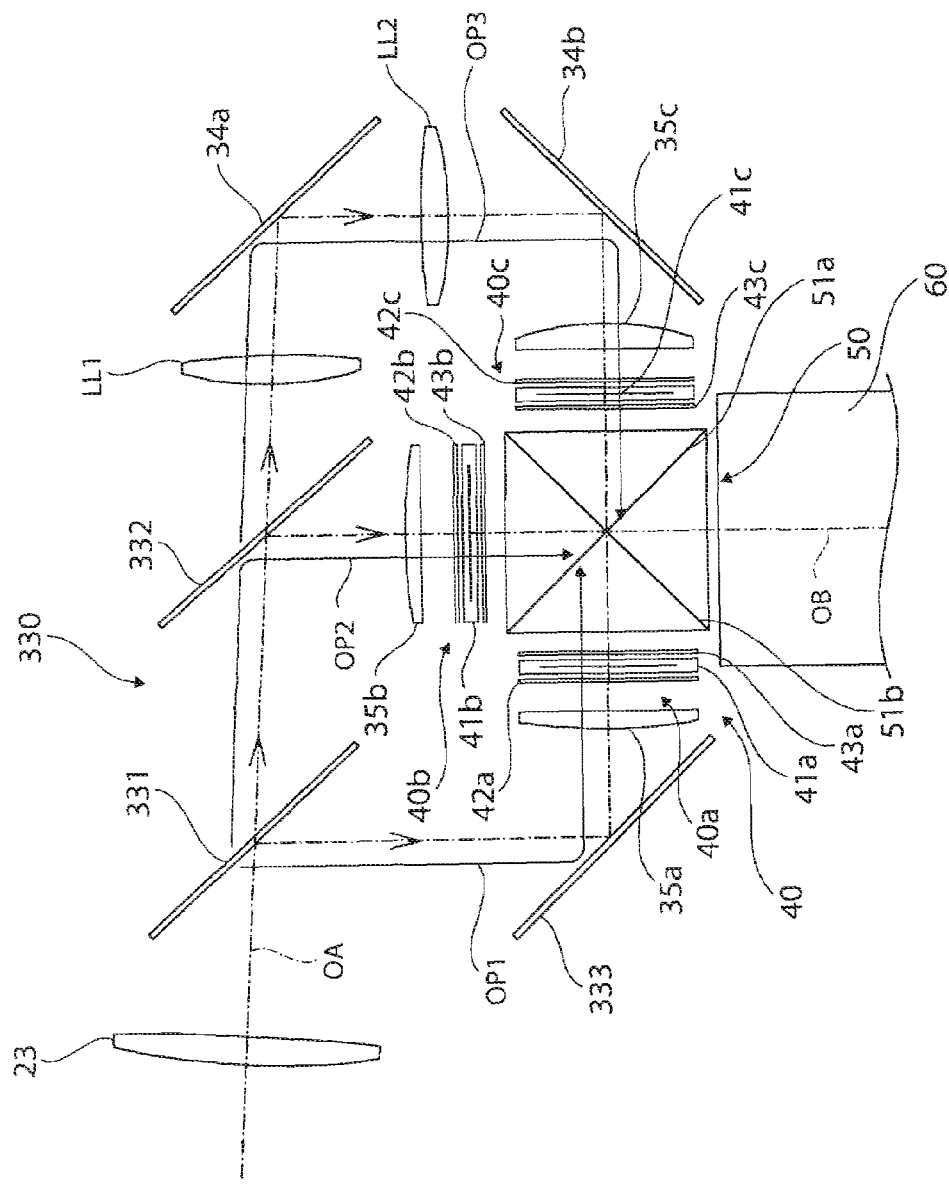
FIG. 6 is a plan view illustrating a color separating optical system of a projector according to a modification of the second embodiment.

FIG. 6 is a plan view illustrating a color separating optical system 330 of a projector according to a modification of the second embodiment. In this modification, the projector is similar to the projector shown in FIG. 5 except for the arrangement of components of the color separating optical system, and thus a description of the overall structure of the projector will be omitted.

In this modification, contrary to the structure shown in FIG. 5, an angle formed between the optical axis OA of illumination light and the optical axis OB of emission light is larger than 90°. In this case, similar to the second embodiment, a second dichroic mirror 332 for bending the second optical path OP2 is inclined at a predetermined angle to align the second optical path OP2 with the optical axis OB of emission light. In addition, a first dichroic mirror 331 is arranged substantially in parallel to the second dichroic mirror 332, and the first optical path OP1 is substantially parallel to the second optical path OP2. A first reflecting mirror 333 is arranged so as to be inclined at an angle of 45° with respect to the first optical path OP1, which causes the first optical path OP1 to be bent at a right angle. In this way, the first optical path OP1 and the second optical path OP2 are perpendicular to each other such that light components passing through the first optical path OP1 and second optical path OP2 are incident on the cross dichroic prism 50 at right angles to each other.

In the above-mentioned structure, the length of the first optical path OP1 is larger than the length of the second optical path OP2. Therefore, it is possible to pass light in a relatively long wavelength range (for example, an R light component) through the first optical path OP1 and thus to obtain a difference between the length of the first optical path OP1 and the length of the second optical path OP2 suitable for compensating axial chromatic aberration, similar to the first embodiment.

In the above-mentioned embodiments, characteristics of a dichroic film attached to the first dichroic mirror 31 may vary according to an angle at which the first dichroic mirror 31 is arranged. That is, in general, the dichroic mirror films are designed so as to have the optimum film characteristics at an angle of 45°, which is a basic incident angle of light; however, in this embodiment, the dichroic mirror films may be designed according to the incident angle of light that varies in accordance with the arrangement angles of the dichroic mirrors.

In the above-mentioned embodiments, the third optical path OP3 among the first to third optical paths OP1 to OP3 is relayed, but the invention is not limited thereto. For example, the invention may be applied to a projector that separates light into light components passing through optical paths having the same length.

The invention is not limited to the above-mentioned embodiments, but it can be modified in various ways without departing from the scope and spirit of the invention. For example, the following modifications can be made.

In the above-mentioned embodiments, a high-pressure mercury lamp is used as the light source 11. However, instead of the high-pressure mercury lamp, other lamps such as a metal halide lamp may be used as the light source.

In the above-mentioned embodiments, the projector 10 includes three liquid crystal light valves 41a to 41c. However, the invention may be applied to a projector using one liquid crystal panel, a projector using two liquid crystal panels, or a projector using four or more liquid crystal panels.

In the above-mentioned embodiments, a front protector that projects an image on the screen in the viewing direction. However, the invention may be applied to a rear projector that projects an image in a direction opposite to the viewing direction.

The priority applications Numbers JP2006-127413 upon which this patent application is based is hereby incorporated by reference. While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A projector comprising:
a light source that emits light;
an illumination optical system that includes a superimposing optical element capable of performing superimposition illumination and that uniformizes the light emitted from the light source to form illumination light, the superimposing optical element having a first focal distance corresponding to a first color light component and a second focal distance corresponding to a second color light component, the first and second focal distances are not identical;
a color separating optical system that includes:
　a dichroic mirror which reflects the first color light component of the illumination light through a first optical path by a reflection angle and transmits a second color light component through the second optical path,
　a first mirror which bends the first optical path by a first bent angle, and
　a second mirror which bends the second optical path by a second bent angle;
light modulating devices that are illuminated by the first and second color light components emitted from the color separating optical system and form color optical images;
a combining optical system that combines the color optical images; and
a projection optical system that projects an image combined by the combining optical system,
　the reflection angle, the first bent angle, and the second bent angle being arranged to provide a predetermined difference between the length of the first optical path and the length of the second optical path,
　the predetermined difference corresponding to a difference between the first focal distance of the superimposing optical element and the second focal distance of the superimposing optical element.

2. The projector according to claim 1, wherein
the superimposing optical element is composed of a single lens, and
when a main wavelength of the first color light component passing through the first optical path and main wavelengths of the second color light component passing through the second optical path are used as reference wavelengths, the length of the first optical path is $L_a$, the length of the second optical path is $L_b$, the refractive index of the single lens with respect to the main wavelength of the first color light component is $n_{\lambda,a}$, the refractive index of the single lens with respect to the main wavelengths of the second color light component is $n_{\lambda,b}$, a curvature radius of an incident surface of the single lens is $r_1$, a curvature radius of an emission surface of the single lens is $r_2$, and the thickness of the single lens is d, the color separating optical system substantially satisfies the following Expression related to a difference $L_a - L_b$:

$$L_a - L_b = f_a - f_b,$$

$$\text{where } \frac{1}{f_a} = (n_{\lambda a} - 1)\left(\frac{1}{r_1} - \frac{1}{r_2}\right) + \frac{(n_{\lambda a} - 1)^2 d}{n_{\lambda b} r_1 r_2}, \text{ and}$$

$$\frac{1}{f_b} = (n_{\lambda b} - 1)\left(\frac{1}{r_1} - \frac{1}{r_2}\right) + \frac{(n_{\lambda b} - 1)^2 d}{n_{\lambda b} r_1 r_2}.$$

3. The projector according to claim 1, wherein the illumination optical system includes a pair of fly-eye lenses.

4. The projector according to claim 1, wherein the first optical path and the second optical path are arranged perpendicular to each other with respect to the combining optical system.

5. The projector according to claim 1, wherein, in the illumination optical system, an optical axis up to the second mirror is perpendicular to an optical axis from the second mirror to the combining optical system, and in the color separating optical system, the dichroic mirror and the first mirror are arranged substantially in parallel to each other.

6. The projector according to claim 1, wherein, in the illumination optical system, an optical axis up to the second mirror is not perpendicular to an optical axis from the second mirror to the combining optical system, and in the color separating optical system, the dichroic mirror and the second mirror are arranged substantially in parallel to each other.

7. The projector according to claim 1, wherein the first color light component is a red light component, and the length the first optical path is larger than the length of the second optical path.

8. The projector according to claim 1, wherein the first color light component is a blue light component, and the length of the first optical path is shorter than the length of the second optical path.

* * * * *